United States Patent
Wu et al.

(10) Patent No.: US 6,904,546 B2
(45) Date of Patent: Jun. 7, 2005

(54) SYSTEM AND METHOD FOR INTERFACE ISOLATION AND OPERATING SYSTEM NOTIFICATION DURING BUS ERRORS

(75) Inventors: Wuxian Wu, Round Rock, TX (US); Paul Dennis Stultz, Round Rock, TX (US); Madhusudhan Rangarajan, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 489 days.

(21) Appl. No.: 10/074,204

(22) Filed: Feb. 12, 2002

(65) Prior Publication Data

US 2003/0154339 A1 Aug. 14, 2003

(51) Int. Cl.[7] .............................................. G06F 11/00
(52) U.S. Cl. ......................................... 714/44; 714/36
(58) Field of Search .............................. 714/44, 9, 33, 714/36, 43, 3; 710/309; 713/2

(56) References Cited

U.S. PATENT DOCUMENTS

| | | | |
|---|---|---|---|
| 5,790,870 A | | 8/1998 | Hausauer et al. ............ 395/733 |
| 5,815,647 A | * | 9/1998 | Buckland et al. .............. 714/3 |
| 6,081,865 A | | 6/2000 | Tavallaei et al. ............ 710/129 |
| 6,237,057 B1 | | 5/2001 | Neal et al. .................. 710/129 |
| 6,523,140 B1 | * | 2/2003 | Arndt et al. .................. 714/44 |
| 6,557,121 B1 | * | 4/2003 | McLaughlin et al. .......... 714/44 |
| 6,625,761 B1 | * | 9/2003 | Sartore et al. ................ 714/43 |

OTHER PUBLICATIONS

Advanced Configuration and Power Interface Specification Jul. 27, 2000, Compaq et al., Revision 2.0, pp. 1, 4, 50, 159–160.*

* cited by examiner

Primary Examiner—Robert Beausoliel
Assistant Examiner—Marc M Duncan
(74) Attorney, Agent, or Firm—Baker Botts L.L.P.

(57) ABSTRACT

A system and method for notifying an operating system of an error signal transmitted by a communications medium is disclosed. The communications medium connects a plurality of electronic devices. The operating system includes device drivers and is capable of configuring communications between one or more applications and the communications medium. A detector is coupled to the communications medium. The detector receives error signals transmitted by the communications medium, one or more error signals associated with one of the electronic devices. A BIOS is coupled to the detector. The BIOS is capable of determining an electronic device associated with a first error signal. The BIOS generates a hot-eject signal identifying that electronic device in response to the first error signal. The operating system blocks communications between the applications and the identified electronic device in response to the BIOS generating the hot-eject signal.

6 Claims, 5 Drawing Sheets

SYSTEM AND METHOD FOR INTERFACE ISOLATION AND OPERATING SYSTEM NOTIFICATION DURING BUS ERRORS

TECHNICAL FIELD

The present disclosure relates generally to the field of electronic device communications and, more particularly, to a system and method for interface isolation and operating system notification during bus errors.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems can include multiple electronic devices that communicate information. Such systems can include physical features that connect to any electronic device having a particular configuration. For example, in a server computer system, circuit boards bearing electronic components (sometimes called expansion cards) that communicate using the PCI local bus can be mounted to expansion connectors in a slot provided for that purpose. Other devices that communicate with the PCI local bus can be directly mounted on the motherboard. These directly mounted devices can be referred to as on board. One server computer system can include multiple slots and a particular slot can accommodate different expansion cards at different times, though usually only one card at a time. While some on board devices can be disabled, they are not easily swappable in the manner of expansion cards. For example, an expansion card that connects a server computer system to a network through a PCI local bus (sometimes called a network card) can be replaced with an expansion card that generates analog signals representing sound, based on commands received from the server computer system through the PCI local bus and that provides those analog signals to a speaker (sometimes called a sound card).

A communication medium, such as a PCI local bus, between electronic devices can potentially transmit communications between a large number of such devices. A number of physical interfaces to the communication medium are provided and electronic devices can be coupled to all or some subset of those interfaces. For example, the PCI local bus may communicate with both on board devices and expansion cards. The communications can be managed on a number of levels. In one implementation, a low level of communications, such as electrical circuit hardware, can address only the sending and receiving of individual bits, while a high level of communications, such as an application software program, can respond to a large group of such bits collected into a file in a particular format.

A physical interface to a communication medium can experience degradation that results in inaccurate communications to and from the electronic device coupled to that interface. The coupled devices themselves can experience hardware and software problems. Processes relying on communications to those devices can be adversely affected when problems in the physical interface or the devices themselves arise. Detection of such communication inaccuracies allows signals to be generated that direct the processes to terminate reliance on the inaccurate communications. It is important that the information handling system's performance is impeded minimally by such detection and reaction. For example, some conventional approaches to detecting and reacting to communications errors experienced by a communications medium can disrupt a software process until the software process is restarted. Restarting such a software process can result in repeat performance of the same tasks, both by the restarted software process and by software processes that depend on it.

For example, if an information handling device was supporting operating system software that controlled access by application programs to information storage and peripheral devices, the disruption of the operating system to an extent that a restart (sometimes called a reboot) had to occur before functionality of that operating system could resume, would impact performance in several ways. Information would not be processed while the operating system restarted and attained the state necessary to allow access by application programs to information storage and peripheral devices. Performance would also be lost to the extent that application programs were unable to reestablish the state at which the operating system was disrupted. In simple terms, hours of previous work could be lost and work could not be performed while the reboot took place.

SUMMARY

In accordance with the present disclosure, a method and system is provided for notifying an operating system of an error signal transmitted by a communications medium is disclosed. The communications medium of the present disclosure connects a plurality of electronic devices. The operating system includes device drivers and is capable of configuring communications between one or more applications and the communications medium. A detector is coupled to the communications medium. The detector receives error signals transmitted by the communications medium, one or more error signals associated with one of the electronic devices. A BIOS is coupled to the detector. The BIOS is capable of determining an electronic device associated with a first error signal. The BIOS generates a hot-eject signal identifying that electronic device in response to the first error signal. The operating system blocks communications between the applications and the identified electronic device in response to the BIOS generating the hot-eject signal.

A technical advantage of the present disclosure is that the operating system of an information handling device is notified that a communications medium error has occurred. Another technical advantage of the present disclosure is that communications between software applications and an electronic device associated with a communications medium error are blocked. Another technical advantage of the present disclosure is that the operating system does not crash in response to receiving notification of the communications medium error. Other technical advantages will be apparent to those of ordinary skill in the art in view of the following specification, claims, and drawings. Various embodiments of the present disclosure obtain only a subset of the advantages set forth. No one advantage is critical to the present disclosure. For example, one embodiment of the present disclosure may only provide the advantage of notifying the operating system of an information handling device that a communications medium error has occurred, while other embodiments may provide several of the advantages.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

The present disclosure concerns a method and system for responding to particular communications medium errors. In a particular implementation, the communications medium is a PCI local bus, PCI local bus is intended to include a PCI-X bus herein, and the response described in the present disclosure involves a determination of the bus-resident device associated with the received error signal, for example a PCI Parity Error (PERR#) or a PCI System Error (SERR#). Once the associated bus-resident device has been determined, appropriate actions can be taken to cease communications with that device, while allowing communications with the other devices.

Figure 1:
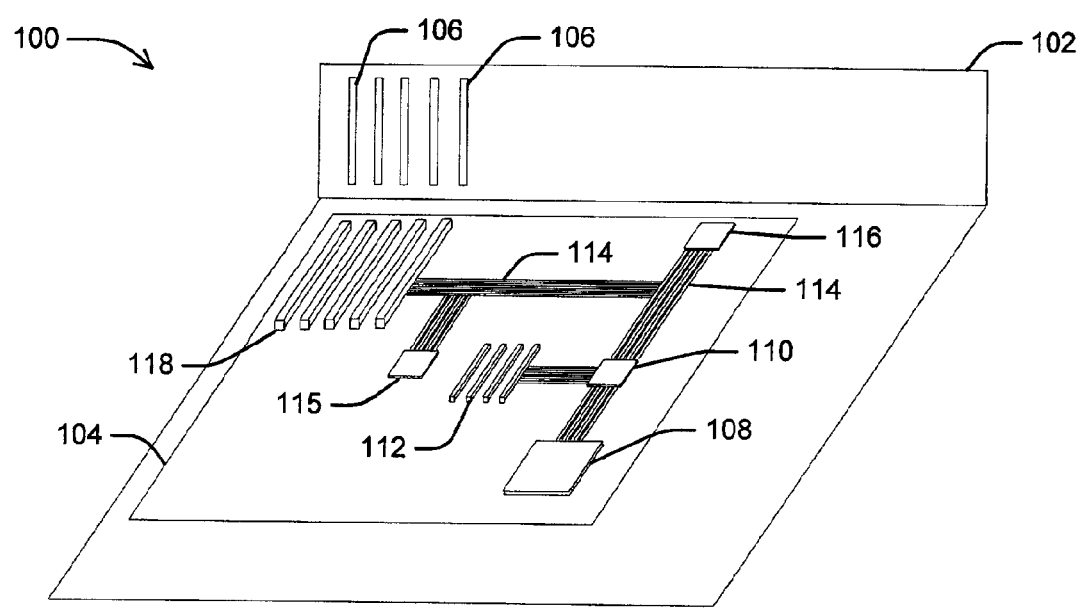
FIG. 1 is a view of an example information handling system.

Shown in FIG. 1 is a diagram of an information handling system, in this case a computer, indicated generally as 100. The computer 100 includes a case or cabinet 102 that provides support for a motherboard 104. The case 102 also includes slots 106 to allow attachment of external connectors to expansion cards mounted in the motherboard 104. Alternative arrangements are also possible. For example, slots 106 can be oriented horizontally rather than vertically. As a further example, the case can be oriented vertically, sometimes referred to as a tower, rather than horizontally.

The motherboard 104 includes a central processing unit or CPU 108. In an alternative configuration, multiple CPUs are included on the motherboard. The CPU 108 is coupled to a bridge device 110. The bridge device 110 controls communications between the CPU 108 and the PCI bus 114. The bridge device 110, sometimes referred to as the north bridge, also controls communications between the CPU 108 and random access memory 112. Software running on the computer 100 includes data stored in the memory 112 as well as data stored in registers or cache in the CPU 108. The software is comprised of instructions that are executed by the CPU 108, even if such execution is only giving a command to another device, for example an expansion card. If the CPU 108 gives a command to an expansion card, the communication including that command is sent to the bridge device 110, which takes control of the PCI local bus 114. The bridge device 110 then places the CPU's command on the bus 114. If the command was for an on board chip 115, a chip installed on the motherboard and not easily removable, that on board chip 115 receives the communication, determines that it is the recipient, and carries out the command. For example, if the on board chip 115 is a video chip, it could carry out the command by outputting a signal representing a particular image to an output port that connects to a monitor. If the command was for an expansion card, the expansion connector 118 in which the expansion card is mounted receives the signal and couples it to the expansion card. The expansion card receives the communication, determines that it is the recipient, and carries out the command. For example, if the expansion card is a sound card, it could carry out the command by outputting a signal representing a particular sound to an output port that connects to a speaker.

Additional busses can be connected to the PCI bus through a second bridge chip 116. An additional bus can be another PCI bus, sometimes called a peer bus, or a different type of bus, for example EISA. The second bridge chip 116 is treated as a PCI device by the computer 100. If the second bridge chip 116 experiences problems, a related error signal can be transmitted by the PCI bus 114. Other devices that are often included in a computer are not shown. For example, many computers include hard drives that are connected through an IDE or SCSI interface.

Figure 2:
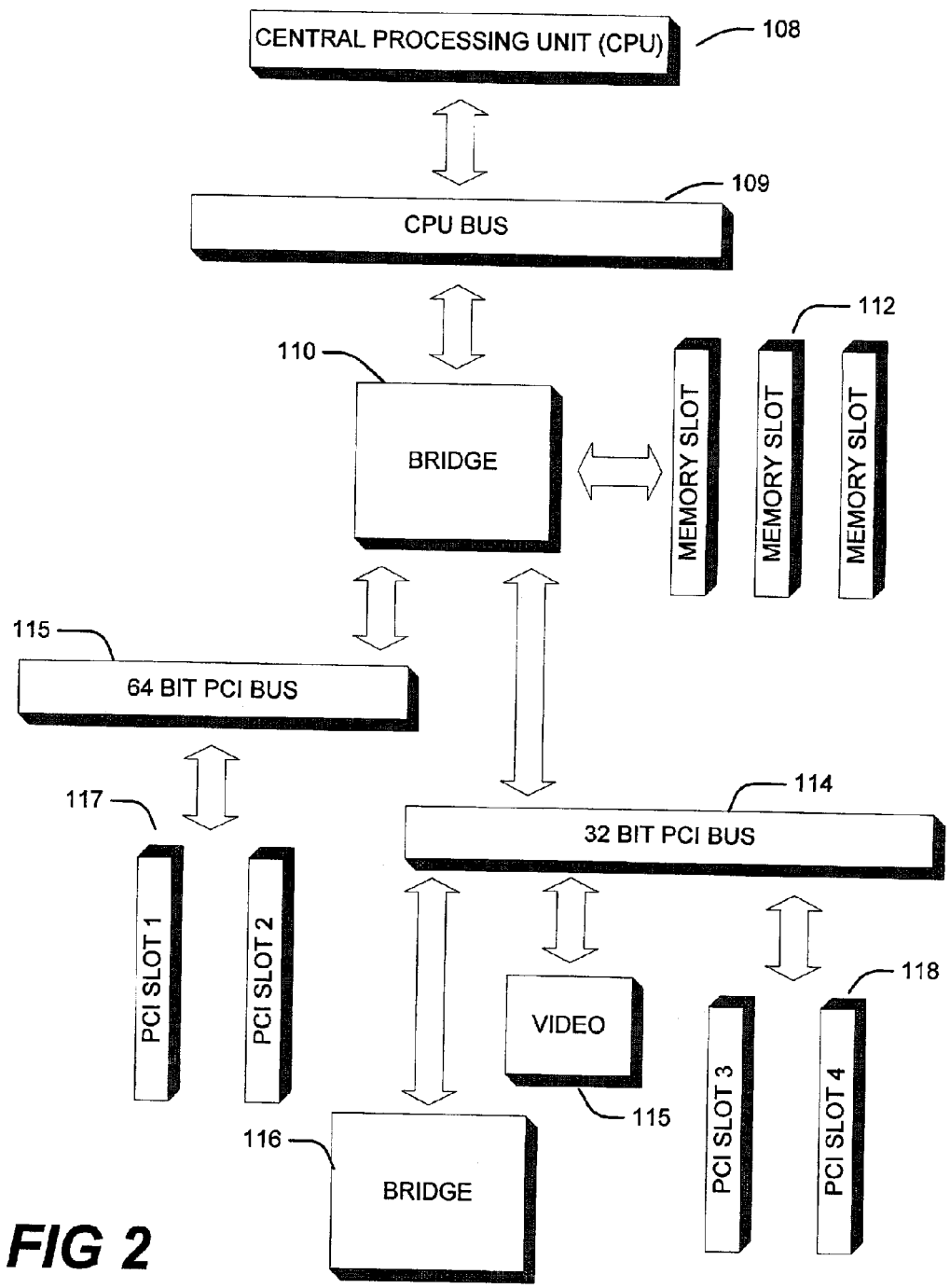
FIG. 2 is a block diagram of an information handling system.

FIG. 2 is a block diagram of an information handling system, in this case a computer. While, FIG. 2 shows a different system than FIG. 1, similar numerals are used to indicate similar components. A CPU 108 is connected to a bridge chip 110 through a CPU bus 109. The bridge chip 110 is coupled to slots for memory boards 112, a 32 bit PCI bus 114, and a 64 bit PCI bus 115. The 64 bit PCI bus 115 is coupled to two expansion slots 117, but no on board devices. The 32 bit PCI bus 114 is coupled to a second bridge chip 116, an on board video PCI device 115, and two expansion slots 118. The terms expansion slot and expansion connector are often used interchangeably. The second bridge 116 can couple the PCI bus to additional PCI busses or busses of other types.

Figure 3:
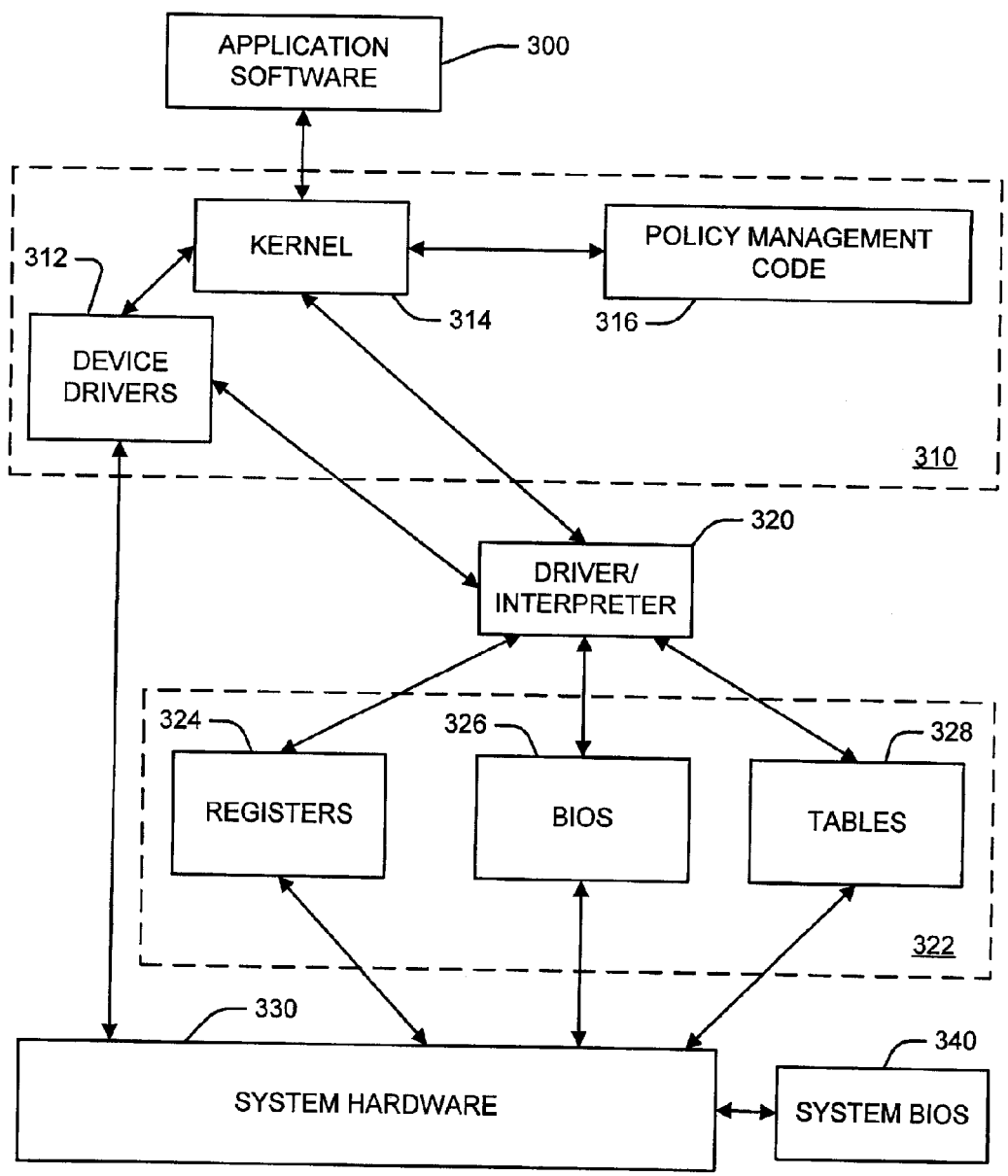
FIG. 3 is a flow diagram of software for an information handling system.

FIG. 3 is a flow diagram of software for an information handling system, in this case a computer. For example, the software shown in FIG. 3 could be run on the systems illustrated in FIGS. 1 and 2. Application software 300 is run by an operating system 310. Application software can include programs that perform tasks such as word processing, operating databases, handling email, playing games or communicating with other computers over a network. Such applications can communicate with peripheral devices that are coupled to an expansion slot or an on board device. For example, a browser program can communicate with a Network Interface Card, or NIC, to send and receive packets of information to display a page of a website. Such a NIC can be either an on board chip or an expansion card.

The application software 300 is handled by the kernel 314 of the operating system 310. The kernel 314 is concerned with current processes being performed. For example, the kernel 314 determines which application software tasks are sent to the CPU for processing and handles processing results received from the CPU. The kernel also communicates with other parts of the operating system 310. For example, the operating system, in an ACPI compliant operating system, includes policy management code 316 that allows a user to configure how the computer uses power. ACPI is an acronym for the Advanced Configuration and Power Interface, which is a computer industry standard used by some operating systems and computers. Such configurations could include when various devices will enter low power modes. The operating system 310 also includes device drivers 312. Device drivers are software programs that each handle communication between a particular operating system, or group of systems, and a device. For example, a video card communicates with applications through a device driver 312 that is installed as part of the operating system 310 when the video card is installed. When an application 300 sends a command to a peripheral device, the operating system 310 receives that command and uses its device driver 312 for that particular device to configure the command in the manner that the device expects.

The operating system 310 can also communicate with an ACPI interpreter 320 that is specific to that operating system 310. The ACPI interpreter 320 allows the operating system 310 to communicate with operating system-independent ACPI software 322. The ACPI software 322 includes registers 324, a BIOS 326, and tables 328. The ACPI software 322 is able to communicate directly with ACPI-compliant system hardware 330. The ACPI software 322 can control the power and configuration status of the hardware. For example, if a shutdown command has been selected by the user, the operating system 310 can relay that command to the interpreter 320 which is able to receive that command from that particular type of operating system 310. The interpreter 320 relays the command to the ACPI BIOS 326, which can determine the present state of the hardware from the registers 324 and tables 328. The BIOS executes whatever commands that are necessary to prepare the system for shutdown based on its present status and then implements the shutdown. The ACPI software 322 makes available an additional, indirect communication path from the system hardware 330 to the operating system 310.

A system BIOS 340 is often provided on a flash memory module separate from other memory on the motherboard. The system BIOS 340 initially controls the computer when a power up occurs and hands control over to an operating system only after performing its own tasks. The system BIOS includes firmware that directly controls the system hardware. Either BIOS, the ACPI BIOS or the system BIOS, can be used to implement hardware communication.

Figure 4:
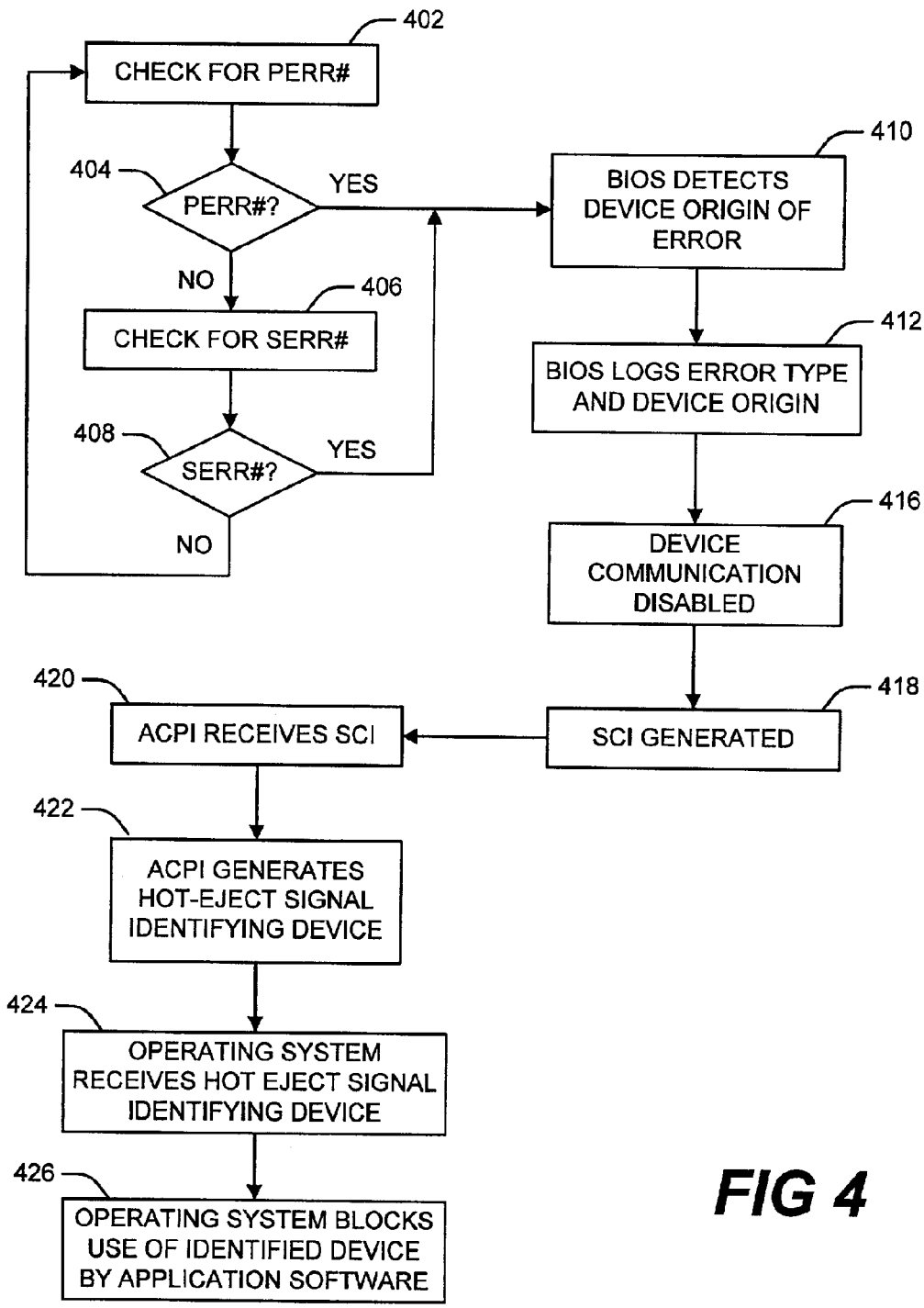
FIG. 4 is a flow diagram of one method of the present disclosure.

FIG. 4 is a flow diagram of one method of the present disclosure. The information handling system, for example a computer, checks for a PCI Parity Error (PERR#) signal 402. The system also checks for a PCI System Error (SERR#) 406. Such a checks could be performed with a polling method or by responding to an interrupt. A particular circuit such as a latch can be used to detect a change in state on a particular bus line that corresponds to the error signal. If either type of error signal is transmitted on the PCI bus 404, 408, a series of steps are performed in response. Otherwise, in this particular implementation, the system continues to poll the bus or operate normally until an interrupt is received. The error signal may be part of or accompanied by a System Management Interrupt (SMI) generated by system firmware.

Once such an error signal has been received, a BIOS, either the ACPI BIOS or the system BIOS, detects the electronic device on the PCI bus that is associated with the PERR# or SERR# 410. For example, the detected device can be an on board device or an expansion card. The BIOS logs the type of error, PERR# or SERR#, along with the associated device 412. In response to the error signal, communication with the identified device is disabled 416, that process is described in more detail in FIG. 5. The error signal also results in an SCI 418, a System Control Interrupt, that can be generated by the BIOS. In one implementation, the BIOS includes an SMI handler that will generate the SCI in response to receiving the error signal or SMI. The BIOS can also receive different error signals for which it does not generate a hot-eject SCI.

The ACPI software receives the System Control Interrupt 420. In response to receiving the SCI, the ACPI software generates a operating system-specific hot-eject signal that identifies the device that is associated with the error 422. The operating system receives that signal 424, and in response the operating system blocks use of the identified device, and hence communications with it, by application software 426. If the identified device is not a critical PCI device, the operating system will be unaffected and will not need to be restarted as a result of the PCI error. As a result of steps 414, 418, 420, and 422, the operating system blocks communication in response to the signal generated by the BIOS.

BIOS is a term used to describe certain software in Intel 32 bit systems, software involved in the booting up and low level management of a system. Software that performs the same functions in other systems is referred to by various names, including the name system firmware for software that performs at least the same functions of BIOS in an Intel 32 bit system. BIOS, with respect to systems that do not employ that term, is intended to encompass system software that handles interrupts generated in response to bus parity and system errors.

In an alternative implementation, the steps can be performed in a different order. As one example, the BIOS could disable device communication 416 prior to logging the error 412. In another alternative implementation, the SCI hot-eject signal 418, could be transmitted to the operating system by a different pattern of signals. In another alternative implementation, the ACPI software executes the ACPI EJ0 method in response to receiving an SCI. In another alternative implementation, the BIOS generates a hot-eject SCI for one of the PERR# and SERR# error signals, but no the other.

Figure 5:
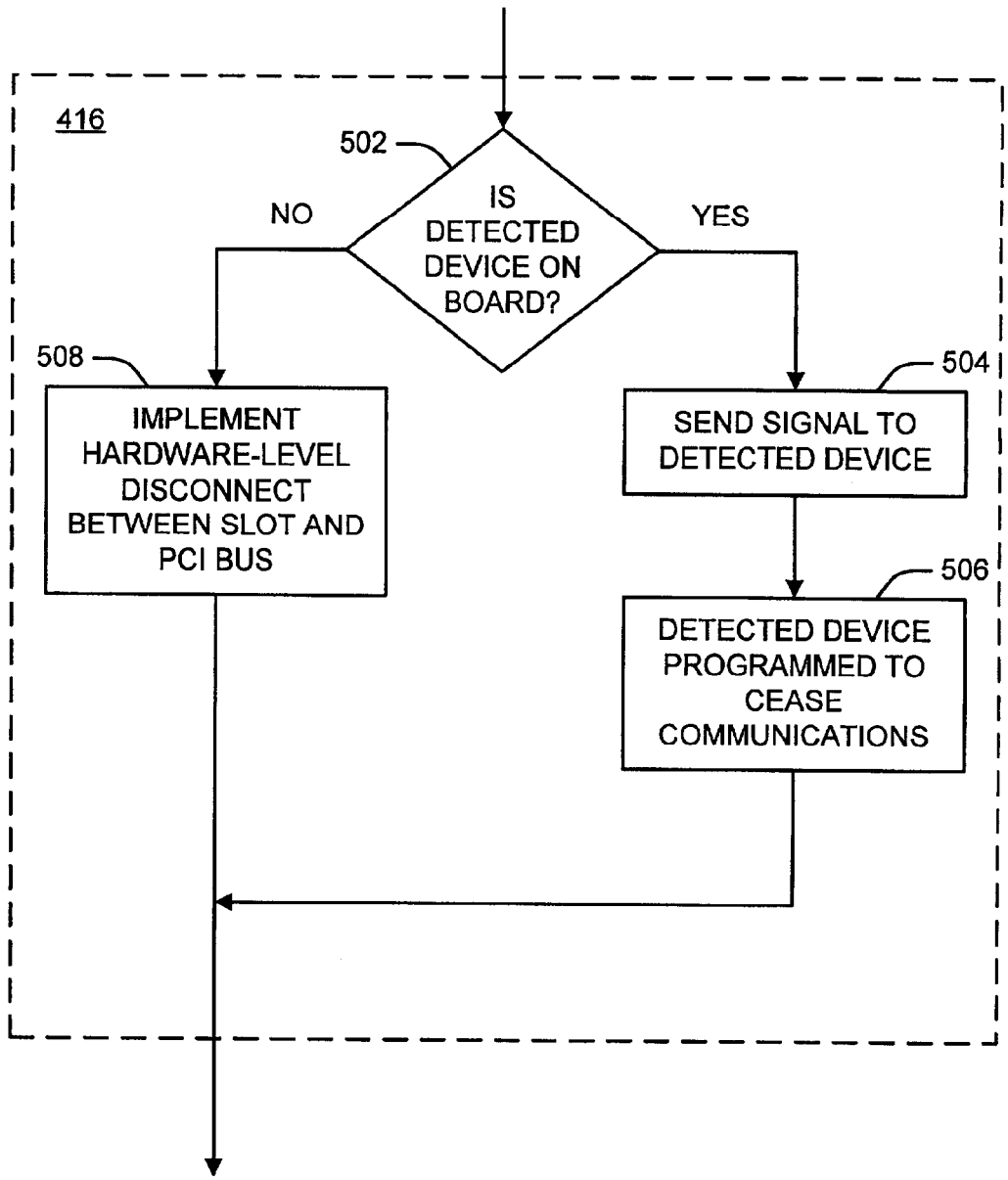
FIG. 5 is a flow diagram of a device communication disabling method.

FIG. 5 is a flow diagram of a device communication disabling method 416. Different methods of disabling the identified device can be used depending on whether the device is on board or in an expansion slot 502. If the device is in an expansion slot, a hardware-level disconnect can be implemented between the expansion connector and the bus 508. For example, when the BIOS generates a hot-eject SMI, the SMI handler can turn off the slot using system firmware. One example of such system firmware is Embedded Server Management (ESM).

If the device is on board, for example a video chip on the motherboard or a bridge chip, a signal is sent to the device 504. In response to the signal, the device programs itself to cease communications with the PCI bus 506. Multiple devices can be affected by the failure of a single device. For example, if the single device is a bridge, multiple PCI devices are no longer reachable if the bridge stops communicating. In one implementation, signals would be sent to the operating system for each device that has been disabled as a result of disabling the bridge. Such signals could be provided in the manner described herein. In addition, disabling a PCI device can result in the renumbering of the remaining PCI devices. Under some circumstances, renumbering does not occur until the system is rebooted.

In an alternative implementation, both devices on board and devices on expansion cards can be disabled in the same manner. Signals could be sent to devices on expansion cards to program them to cease communications. If a hardware problem is present, for example random signals being sent regardless of the programming, actually physical disconnection of the device from the bus can be performed.

Although the present disclosure has been described in detail, it should be understood that various changes, substitutions, and alterations can be made hereto without departing from the spirit and the scope of the invention as defined by the appended claims.

What is claimed is:

1. An information handling system, comprising:
   a communications medium connecting a plurality of electronic devices;
   an operating system, including device drivers, capable of configuring communications between one or more applications and the communications medium;
   a detector coupled to the communications medium, the detector receiving error signals transmitted by the communications medium, one or more error signals associated with one of the electronic devices; and
   a BIOS coupled to the detector, the BIOS capable of determining an electronic device associated with a first error signal and the BIOS generating a hot-eject signal identifying that electronic device in response to the first error signal;
   wherein the operating system blocks communications between the applications and the identified electronic device in response to the BIOS generating the hot-eject signal,
   wherein the BIOS creates a log entry in response to receiving the first error signal.

2. An information handling system, comprising:
   a communications medium connecting a plurality of electronic devices;
   an operating system, including device drivers, capable of configuring communications between one or more applications and the communications medium;
   a detector coupled to the communications medium, the detector receiving error signals transmitted by the communications medium, one or more error signals associated with one of the electronic devices; and
   a BIOS coupled to the detector, the BIOS capable of determining an electronic device associated with a first error signal and the BIOS generating a hot-eject signal identifying that electronic device in response to the first error signal;
   wherein the operating system blocks communications between the applications and the identified electronic device in response to the BIOS generating the hot-eject signal,
   wherein the BIOS does not generate a hot-eject signal in response to a second error signal.

3. An information handling system, comprising:
   a communications medium connecting a plurality of electronic devices;
   an operating system, including device drivers, capable of configuring communications between one or more applications and the communications medium;
   a detector coupled to the communications medium, the detector receiving error signals transmitted by the communications medium, one or more error signals associated with one of the electronic devices; and
   a BIOS coupled to the detector, the BIOS capable of determining an electronic device associated with a first error signal and the BIOS generating a hot-eject signal identifying that electronic device in response to the first error signal;
   wherein the operating system blocks communications between the applications and the identified electronic device in response to the BIOS generating the hot-eject signal,
   wherein the identified electronic device is an expansion card and further comprising an expansion connector coupled to the communications medium and the expansion card, wherein the expansion connector ceases communications with the communications medium after the first error signal is transmitted as a result of the first error signal,
   wherein embedded server management causes the expansion connector to cease communications with the communications medium in response to the first error signal.

4. A method of notifying an operating system of a communications error, comprising:
   detecting a first error signal on a communications medium, the communications medium connecting a plurality of electronic devices;
   determining an electronic device associated with the first error signal;
   generating a hot-eject signal that identifies the electronic device associated with the first error signal;
   blocking communications between at least one application and the identified electronic device with an operating system that includes device drivers in response to receiving the hot-eject signal; and,
   creating a log entry in response to the first error signal.

5. A method of notifying an operating system of a communications error, comprising:
   detecting a first error signal on a communications medium, the communications medium connecting a plurality of electronic devices;
   determining an electronic device associated with the first error signal;
   generating a hot-eject signal that identifies the electronic device associated with the first error signal;
   blocking communications between at least one application and the identified electronic device with an operating system that includes device drivers in response to receiving the hot-eject signal,
   wherein a hot-eject signal is not generated in response to a second error signal.

6. A method of notifying an operating system of a communications error, comprising:
   detecting a first error signal on a communications medium, the communications medium connecting a plurality of electronic devices;
   determining an electronic device associated with the first error signal;
   generating a hot-eject signal that identifies the electronic device associated with the first error signal;
   blocking communications between at least one application and the identified electronic device with an operating system that includes device drivers in response to receiving the hot-eject signal,
   wherein the identified electronic device is an expansion card coupled to an expansion connector that is also coupled to the communications medium and further comprising the step of disabling communications between the communications medium and the expansion connector after the first error signal is detected in response to the first error signal, wherein the step of disabling is performed by embedded server management.

* * * * *